United States Patent [19]

Song

[11] 4,277,866
[45] Jul. 14, 1981

[54] JEWELRY CLASP AND METHOD

[76] Inventor: Chang J. Song, #20-17, Yangjae-Dong, Kang Nam-Ku, Seoul, Rep. of Korea

[21] Appl. No.: 114,869

[22] Filed: Jan. 24, 1980

[51] Int. Cl.³ .............................................. A44B 19/00
[52] U.S. Cl. .................................. 24/238; 24/230 R; 24/230 AK; 24/230.5 R; 292/175; 24/326; 24/374
[58] Field of Search .............. 24/238, 230.5 R, 230 R, 24/230 AK, 69 J, 73 HR; 292/175

[56] References Cited

U.S. PATENT DOCUMENTS

| | | | |
|---|---|---|---|
| 370,918 | 10/1887 | Armstrong | 24/238 |
| 1,093,945 | 4/1914 | Ohlsson | 24/230.5 R |
| 1,114,289 | 10/1914 | Rittenhouse | 24/238 |
| 1,758,337 | 5/1930 | Sheller | 292/175 |
| 1,771,427 | 7/1930 | Waterhouse | 24/238 |
| 2,499,077 | 2/1950 | Roysher | 24/230.5 R |
| 2,884,672 | 5/1959 | Tracy | 24/238 |
| 2,902,738 | 9/1959 | Owens | 24/230 R |
| 2,986,788 | 6/1961 | Hasek | 24/238 |
| 3,988,813 | 11/1976 | Korcey, Jr. | 24/238 |

FOREIGN PATENT DOCUMENTS 987075  4/1976  Canada ................................ 24/73 HR Primary Examiner—Victor N. Sakran
Attorney, Agent, or Firm—Townsend and Townsend

[57] ABSTRACT

A small, strong jewelry clasp which requires fewer manufacturing steps to produce is disclosed. A generally flat, rectangular, elongate pin body is formed having a finger element extending from one end thereof. The other end of the pin body typically has a hole formed therethrough to capture a link of a chain. The upper surface of the pin body has a notch formed therein for receipt of a compression spring. This notch is bounded on one end by a spring stop portion of the pin body. The other end of the notch is open. A box-like enclosure member is formed by folding a flat piece of malleable material to fit around both the pin body and the notch formed in the pin body. A portion of the enclosure which is near the open end of the notch is folded inwardly so that when the enclosure is slid over the pin body, a spring is captured between the spring stop portion of the pin body and inwardly folded portion of the enclosure. The finger element is then bent into a generally J-shaped configuration so that the end of the free end of the finger element abuts the inwardly folded portion of the enclosure. The enclosure is typically provided with a protuberance or handle by which the enclosure can be urged against the biasing force of the compression spring to create a gap between the inwardly folded portion of the enclosure and the free end of the finger element. A link of a jewelry chain is placed into and secured within the aperture formed by the finger element, the pin body and the enclosure.

2 Claims, 6 Drawing Figures

JEWELRY CLASP AND METHOD

This invention is related to jewelry clasps, specifically one which is small, strong, and requires fewer manufacturing steps to produce.

BACKGROUND OF INVENTION

It is well known that a chain is only as strong as its weakest link. It is also quite true, and especially in relation to jewelry, that the fastening means or jewelry clasp can often be the weakest link in the chain. Jewelry clasps are a necessary part of many jewelry items such as bracelets and many necklaces. They must be as inconspicuous as possible so as not to detract from the ornamental appearance of the jewelry. The conflicting demands placed upon jewelry clasps to be small in size, low in cost, and yet strong and dependable generally cause manufacturers to compromise as to one or more of these aspects. One way for the manufacturer to meet the requirement for small size and strength while at the same time keeping the cost of production low, would be to reduce the number of manufacturing steps needed to produce the clasp.

SUMMARY OF THE INVENTION

The present invention provides a substantial improvement over the prior art clasps by providing a jewelry clasp that is inherently strong, uncluttered and straightforward in structure, yet aesthetically pleasing. The clasp of the present invention can be manufactured using fewer steps than previously possible.

According to the present invention, a jewelry clasp is provided with a generally flat, rectangular pin body which is formed having a finger element extending from one end thereof. The other end of the pin body typically has a hole formed therethrough to capture a link of a chain. The upper surface of the pin body has a notch formed therein for receipt of a compression spring. This notch is bounded on one end by a spring stop portion of the pin body. The other end of the notch is open.

A box-like enclosure member is formed by folding a flat piece of malleable material to fit around both the pin body and the notch formed in the pin body. A portion of the enclosure which is near the open end of the notch is folded inwardly so that when the enclosure is slid over the pin body, the spring is captured between the spring stop portion of the pin body and inwardly folded portion (or spring capture element) of the enclosure. The finger element is then bent into a generally J-shaped configuration so that the terminus of the free end of the finger element abuts the inwardly folded portion of the enclosure.

The enclosure is typically provided with a protuberance or handle by which the enclosure can be urged against the biasing force of the compression spring to create a gap between the inwardly folded portion of the enclosure and the free end of the finger element. This allows a link of a jewelry chain to be placed into the aperture formed by the finger element, pin body and the enclosure. Upon releasing the handle, the compression spring forces the inwardly folded portion against the terminus of the free end thereby capturing the link within the aperture.

An advantage of the present invention is that the disclosed clasp design is inherently very strong. This is due, in part, to the fact that the tension forces produced by the chain on the clasp produce no forces on any moving part.

The present invention also reduces some of the operational problems of prior art clasps. The spring of the present invention is completely enclosed by the pin body and the enclosure. Thus, there is no possibility that the spring could get tangled up in an article of clothing or that it could interfere with the proper operation of the clasp. The relatively long, flat, inner surfaces of the enclosure which slide over the flat outer surfaces of the pin body keep the enclosure in a very stable sliding relationship with the pin body. Therefore, problems resulting from the movable element of the clasp cocking or otherwise shifting out of alignment are virtually eliminated.

The enclosure is also provided with a recess which allows a longer sliding distance of the enclosure than would otherwise be possible without such recess. This allows the clasp to be made smaller, and thus more inconspicuous, relative to the size of the chain link it can accommodate.

The design of the clasp requires fewer steps in its production and assembly compared with the prior art clasps. Typically, the pin body is stamped from flat sheet stock. The enclosure is likewise stamped out of relatively thin sheet stock and then folded over into its final configuration. A commercially available spring is placed in the notch in the pin body. The folded, box-like enclosure is slipped over the outwardly extending finger element of the pin body until the compression spring is captured between the spring stop portion of the pin body and the spring capture element of the box like enclosure. Finally, the finger element is bent into a generally J-shaped configuration so that the free end of the finger element can be engaged by the biased spring capture element of the enclosure.

DESCRIPTION OF THE PREFERRED EMBODIMENT

Figure 1:
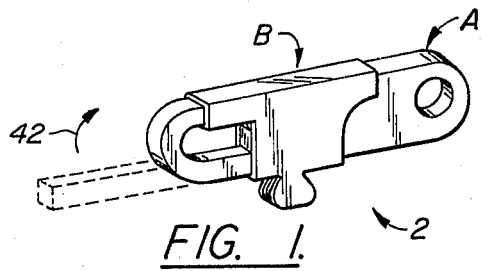
FIG. 1 is an isometric view of the clasp in its assembled configuration with the finger element shown in its original, linear configuration by broken lines.

Turning now to the Figures, jewelry clasp 2 is seen to comprise generally a pin body A, a generally box like enclosure B, and a compression spring C, of which FIG. 1 shows the preferred embodiment assembled.

Figure 2:
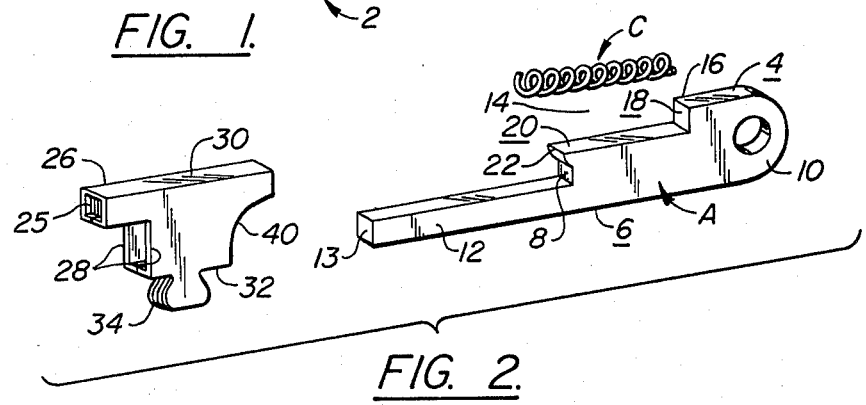
FIG. 2 is an isometric view of the pin body, the compression spring, and the box-like enclosure.

Referring now to FIG. 2, pin body A is seen to be a generally flat elongated rectangular member having an upper surface 4, a lower surface 6 and a first end 8 and a second end 10. An elongated finger element 12 extends from the first end 8 of pin body A in the area adjacent to lower surface 6. Pin body A is made from a malleable material, such as gold plated brass, to allow finger element 12 to be bent upwardly into a generally J-shaped configuration. Although in the embodiment shown finger element 12 is J-shaped, other shapes, such as U-shaped, which provide a suitably shaped opening could also be provided. A notch 14 is formed along upper surface 4 and extends from first end 8 to a spring stop portion 16 of pin body A. Portion 16 has a face surface 18 which is generally perpendicular to the base surface 20 of the notch. A shoulder portion 22 extends outwardly away from first end 8 at the intersection of first end 8 and base surface 20, thus providing for base surface 20 to extend past first end 8.

Figure 3:
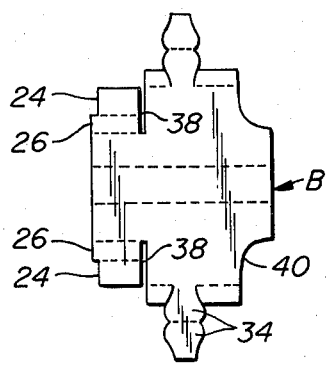
FIG. 3 is a plan view of the enclosure prior to being folded.

At FIG. 3 enclosure B is shown in its flat, unfolded configuration. The dashed lines on the figure represent lines along which the appropriate folds will be made to produce the final box-like configuration of enclosure B. It should be noted that the outer edges 24 of spring capture portions 26 are recessed. This provides a recessed seating surface 25 for the free end of finger element 12 when enclosure B is folded into its box-like configuration (see FIG. 4).

FIG. 2 shows enclosure B in its final, folded form having two flat parallel sides 28, a generally flat top portion 30, and a bottom portion 32. Although pin body A and enclosure B are shown having flat, parallel sides, their sides could be otherwise, such as convex, so long as the inner surface of sides 28 follow the contour of the sides of pin body A. A handle 34 extends from bottom portion 32. Spring capture portion 26 is formed at one end of top portion 30. The internal portion of enclosure B between sides 28 is hollow with the exception of spring capture portion 26. In the preferred embodiment, portion 26 is provided by bending over a portion of the flat stock from which enclosure B is made. The presence of spring capture portion 26 is necessary because the internal edges 38 of portion 26 provide a surface against which spring C exerts its closing force. Also, seating surface 25 of portion 26 is the surface against which the terminus of free end 13 of finger element 12 seats.

Figure 4:
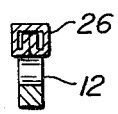
FIG. 4 is a cross-sectional view taken along lines 4—4 of FIG. 5.

FIG. 4 illustrates the bent, layered structure of handle 34 and spring capture portion 26. The method of creating the capture portion and the handle by folding over portions of the initially flat enclosure reduces the number of separate elements which must be produced. Thus, the cost is lowered. If desired a handle could be attached separately by suitable means, such as by using silver solder. Also, the handle could be eliminated if desired, although manipulation of the clasp would no doubt be more difficult.

Figure 5:
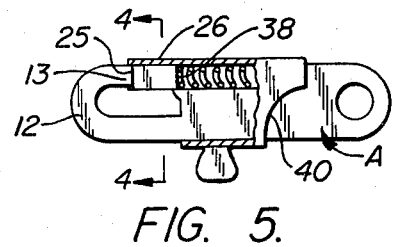
FIG. 5 is a side view of the clasp in a closed configuration with a portion of the enclosure broken away.
Figure 6:
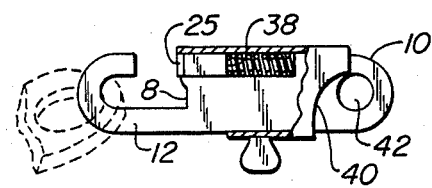
FIG. 6 is a side view of the clasp in an open configuration with a portion of the enclosure broken away.

In FIG. 5, the clasp is shown in the closed position with the terminus of free end 13 seated against seating surface 25. FIG. 6 shows enclosure B retracted, thus compressing compression spring C and opening clasp 2, so that a ring or loop end of a piece of jewelry, such as a chain, may be inserted between seating surface 25 and free end 13 and into the aperture defined by J-shaped finger element 12, spring capture portion 26 and first end 8.

Referring specifically to FIGS. 5 and 6, it can be seen how the recess 40 in enclosure B allows the enclosure to be urged more fully towards second end 10, and yet not interfere with a chain link or the like which may be passed through a hole 42, typically formed in body A at second end 10. This allows the total length of the clasp to be shortened for the same length of enclosure travel. The length of travel of the enclosure determines the size of a link of a chain which can be inserted between seating surface 25 and free end 13. Therefore, the clasp size is reduced for the same size chain link diameter which can be accommodated.

The manufacturer of the clasp is particularly straightforward. Pin body A and enclosure B may be simply and easily manufactured by methods known to those skilled in the art. Spring C is of a type commercially available. The assembly of body A, enclosure B and spring C may proceed generally as follows. The spring is placed within the notch in the pin body. The enclosure is folded and formed about a suitable form into its final box-like configuration. After the enclosure is formed by folding, the enclosure is slid over the outwardly extending finger element of the body. This captures the spring within the notch so that the spring is bounded by base surface 20, face 18, the interior walls of sides 28, the interior wall of top portion 30 and by internal edges 38. The finger element is then bent upwardly, as indicated in FIG. 1 by arrow 42, into a generally J-shaped configuration so that the free end of the finger element opposes the seating surface. The length of the finger element and the degree of bending imparted thereto are chosen so that a sufficient gap between the free end of the finger element and the outer edge of the capture portion is created when the enclosure fully compresses the spring; however, it is preferable that the length of travel should not be so great that the spring becomes exposed any time during use. This total enclosure of the spring helps ensure that dirt and other debris does not enter into the notch and thus possibly foul the operation of the clasp. It is preferred that seating surface 25 be slightly recessed for engagement with free end 13. This helps to ensure that nothing will become wedged between the free end and the seating surface, which could cause the clasp to inadvertently open.

Alternatively, the enclosure can be formed about the pin body having the spring already placed into the slot. This would effectively result in the pin body acting as the form about which the enclosure is folded.

Thus, although the best mode contemplated for carrying out the present invention has been herein shown and described, it will be apparent that modification and variation may be made without departing from what is regarded to be the subject of the invention.

I claim:

1. A jewelry clasp comprising:

a relatively flat, elongate pin body made of malleable metal having a first end and a second end and having a finger element extending from said first end, said finger element being generally J-shaped;

said body having a spring notch formed along the upper edge of said body, said notch being bounded at one end by a spring stop portion of said body and being open at the opposed end thereof, said spring stop portion and the free end of said J-shaped finger element being in opposed, spaced, relation;

a box-like enclosure surrounding at least a portion of said body and completely surrounding said spring notch, said enclosure having an enclosure spring stop element disposed between said free end of said finger element and said spring stop portion of said body and being slidable parallel to said spring notch, said spring stop element having an inner face facing said spring stop portion and a seating surface facing said free end; and a compression spring captured within said spring notch and between said spring stop portion and said inner face thereby biasing said seating surface against the free end of said finger element to define a closeable aperture bounded by said J-shaped finger element, said enclosure and said pin body.

2. The jewelry clasp of claim 1 wherein said enclosure includes:
   a handle extending therefrom for urging said enclosure along said pin body; and
   a recess formed along the sides thereof thereby enabling said enclosure to be slid along said pin body further without the movement of said enclosure being obstructed by a chain link passing through a hole formed in said second end of said pin body.

* * * * *